(12) United States Patent
Dugan et al.

(10) Patent No.: US 9,467,579 B2
(45) Date of Patent: Oct. 11, 2016

(54) WINDOW PICTURE SYSTEM

(71) Applicants: Janis Dugan, Deland, FL (US); Robert Dugan, Deland, FL (US)

(72) Inventors: Janis Dugan, Deland, FL (US); Robert Dugan, Deland, FL (US)

( * ) Notice: Subject to any disclaimer, the term of this patent is extended or adjusted under 35 U.S.C. 154(b) by 0 days.

(21) Appl. No.: 13/686,446

(22) Filed: Nov. 27, 2012

(65) Prior Publication Data

US 2014/0146348 A1    May 29, 2014

(51) Int. Cl.
  *G06K 15/00* (2006.01)
  *H04N 1/00* (2006.01)

(52) U.S. Cl.
  CPC .................. *H04N 1/00129* (2013.01)

(58) Field of Classification Search
  None
  See application file for complete search history.

(56) References Cited

U.S. PATENT DOCUMENTS

| | | | |
|---|---|---|---|
| 1,758,690 A * | 5/1930 | Dexter | 160/72 |
| 2,563,696 A * | 8/1951 | Wayne | 15/250.03 |
| 3,292,196 A * | 12/1966 | Windorf | 15/103 |
| 4,101,210 A * | 7/1978 | Lo et al. | 353/7 |
| 4,132,468 A * | 1/1979 | Lo et al. | 353/7 |
| 4,160,348 A * | 7/1979 | Chapman et al. | 52/202 |
| 4,674,780 A * | 6/1987 | Weinerman et al. | 292/336.3 |
| 5,533,559 A * | 7/1996 | Judkins | 160/84.06 |
| 5,771,952 A * | 6/1998 | Gabriel | 160/98 |
| 6,286,579 B1 * | 9/2001 | Gottschalk | 160/264 |
| 8,104,903 B2 * | 1/2012 | Feliciano | 353/119 |
| 2003/0030289 A1 * | 2/2003 | Fisher et al. | 292/336.3 |
| 2003/0080231 A1 * | 5/2003 | Lowder | 242/385.1 |
| 2003/0156260 A1 * | 8/2003 | Putilin et al. | 353/10 |
| 2003/0163367 A1 * | 8/2003 | Piepel et al. | 705/14 |
| 2004/0221967 A1 * | 11/2004 | Ikle | 160/120 |
| 2007/0118831 A1 * | 5/2007 | Kondo | 717/121 |
| 2009/0027622 A1 * | 1/2009 | Lalley et al. | 353/28 |
| 2009/0046140 A1 * | 2/2009 | Lashmet et al. | 348/51 |
| 2010/0002295 A1 * | 1/2010 | Kimpe | 359/465 |
| 2010/0201836 A1 * | 8/2010 | Kim et al. | 348/222.1 |
| 2011/0099493 A1 * | 4/2011 | Yu et al. | 715/764 |
| 2012/0008103 A1 * | 1/2012 | Lalley et al. | 353/69 |
| 2013/0114098 A1 * | 5/2013 | LeGrande | 358/1.13 |

* cited by examiner

*Primary Examiner* — King Poon
*Assistant Examiner* — Ted Barnes

(57) ABSTRACT

The present invention is a window picture system that includes a retractable window shade pulled down from a top portion of a window, one or more images that include a selected one of one or more pictures, one or more photographs and one or more drawings, a window frame with a bottom and a window sill with a top surfacing. The system also includes a three dimensional projector that displays a selected one of the one or more images and one or more slide shows onto the window, an image change button disposed on the top surfacing of the window sill, a camera SD card inserted into the three dimension projector, a battery and a scanner utilized to scan the selected one of the one or more images and one or more slide shows.

20 Claims, 1 Drawing Sheet

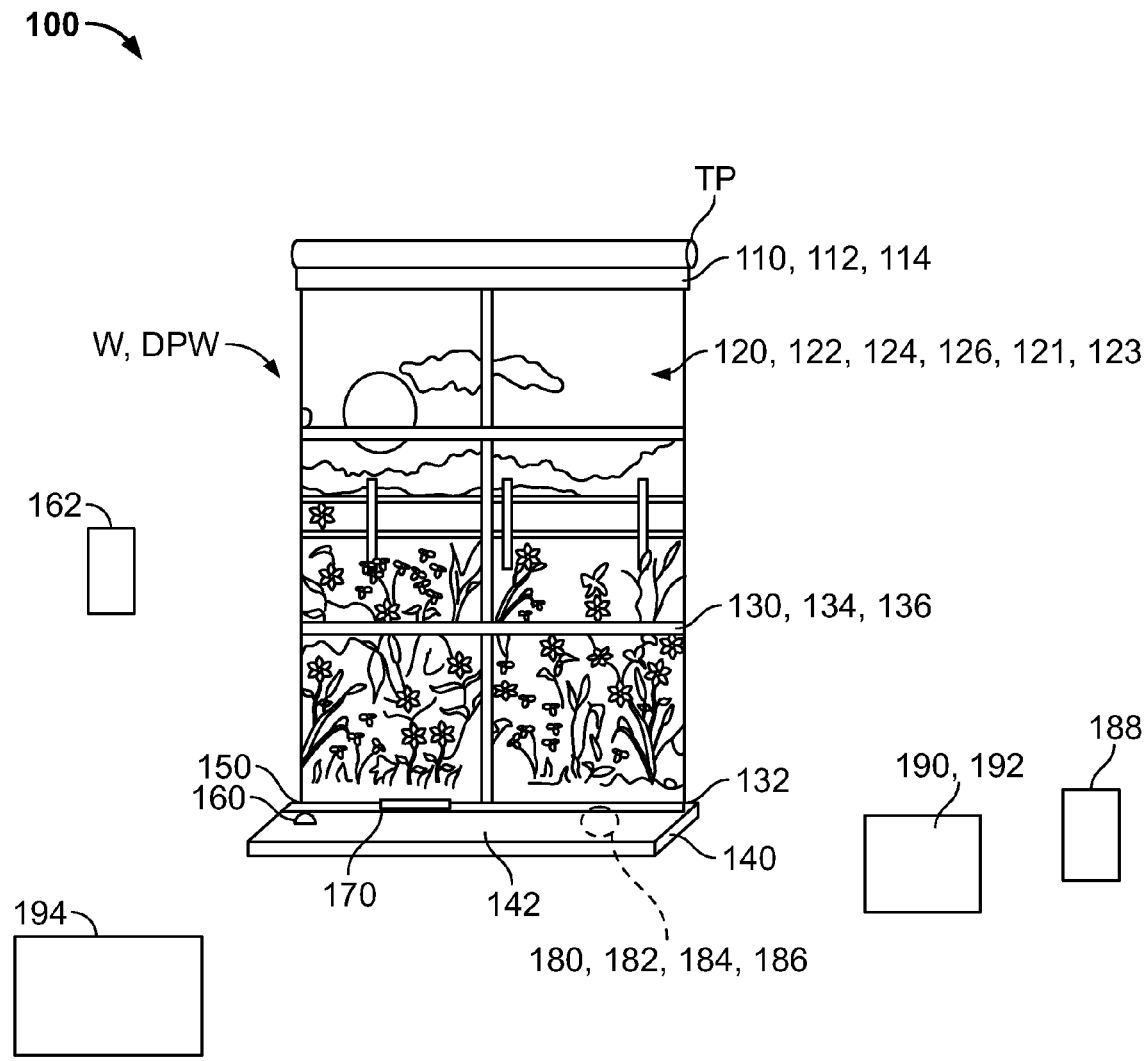

WINDOW PICTURE SYSTEM

TECHNICAL FIELD & BACKGROUND

It is common for individuals to enjoy traveling to various places around the world, taking photos throughout their trips as mementos. For those unable to leave their homes because they may no longer be able to travel, or for those who are simply nostalgic about specific areas, there are limited alternatives of products which relatively effectively replicate the feeling of being there. The present invention generally relates to a picture system. More specifically, the invention is a window picture system.

It is an object of the invention to provide a window picture system that connects a computer scanner to an image projection device utilized by the window picture system.

It is an object of the invention to provide a window picture system that allows a user who is not able to travel to view a variety of desired images.

It is an object of the invention to provide a window picture system that utilizes three-dimensional technology to produce a variety of desired images.

It is an object of the invention to provide a window picture system that utilizes a music box to generate music in combination with a variety of desired locations or images.

What is needed is a window picture system that connects a computer scanner to an image projection device utilized by the window picture system that allows a user who is not able to travel to view a variety of desired images that utilizes three-dimensional technology to produce a variety of desired images that utilizes a music box to generate music in combination with a variety of desired locations or images.

BRIEF DESCRIPTION OF THE DRAWINGS

The present invention will be described by way of exemplary embodiments, but not limitations, illustrated in the accompanying drawings in which like references denote similar elements, and in which:

FIG. 1 illustrates a front view of a window picture system, according to an embodiment of the present invention.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is utilized repeatedly. The phrase generally does not refer to the same embodiment, however, it may. The terms "comprising", "having" and "including" are synonymous, unless the context dictates otherwise.

FIG. 1 illustrates a front view of a window picture system 100, according to an embodiment of the present invention.

The window picture system 100 includes a retractable window shade 110, one or more images 120, a window frame 130, a window sill 140, a three dimensional projector 150, an image change button 160, a camera SD card 170, a battery 180 and a scanner 190. The retractable window shade 110 can be pulled down from a top portion TP of a window W being utilized in combination with the window picture system 100. The window W can be any suitable type of window such as a double paned window DPW, a single paned window (not shown) or any other suitable type of window such as a bay window (not shown). The retractable window shade 110 is typically a white window shade 112 or a sheet of vinyl 114 or other suitable material. The one or more images 120 can be one or more pictures 122, one or more photographs 124, one or more drawings 126 or any other desired suitable type of one or more images 120. The one or more images 120 can be one or more two-dimensional images 121, one or more three-dimensional images 123 or any other suitable type of one or more images. The window frame 130 has a bottom 132 and can be a double paned window 134, a single paned window (not shown) or any suitable window frame. The window frame 130 can also include an interior lined 3 dimensional film 136 removably disposed on the window frame 130. The window sill has a top surface 142 and a side and is perpendicularly attached to the bottom 132 of the window frame 130 and extends outward from the window sill 140.

The three dimension projector 150 displays the one or more images 120 onto the window W and can be any suitable one or more images displayed onto the window W such as a scenic landscape or other desired one or more images or slide shows. The image change button 160 is disposed on the top surfacing 142 of the window sill 140 and can be depressed to move one or more images 120 such as one or more photos from a slide show or other suitable one or more images 120. The window picture system 100 can also utilize a remote control device 162 instead of the image change button 160 to move the one or more images 120. The camera SD card 170 is inserted into the three dimension projector 150 where the one or more images 120 that reside on the camera SD card 170 are displayed onto the retractable window shade 110. The camera SD card 170 can be any suitable dimensions, capacity and number of one or more images 120 can reside on the camera SD card 170. The battery 180 can be a lithium battery 182, an alkaline battery 184, a solar powered battery 186 or the window picture system 100 can be powered by a hard-wire electrical power source such as an electrical outlet 188 to provide electrical power to the window picture system 100. The scanner 190 can be utilized to scan the one or more images 120 and upload the one or more images 120 onto the camera SD card 170. The scanner 190 can be any suitable type of scanner 190 and is typically a digital scanner 192. The window picture system 100 can also be in communication with a computer 194 to download selected music to play with the displayed one or one or more images 120.

The window picture system is made of an approximately 30 inch projection device engineered specifically to display one or more photos or other suitable one or more images directly onto one or more windows of one or more users and is a well suited alternative to traditional window picture systems. The window picture system is relatively easy to use, the one or more users simply covers their window with a white window shade or a vinyl material, inserts a camera SD card loaded with the desired one or more photos or images into the projector and places the projector on the windowsill to display the one or more images. Capable of projecting onto any sized window, the window picture system also includes a remote control as well as a push button disposed on the window sill which allows the user to run through the one or more photos or other one or more images in order to find their favorite one or more images, or to just enjoy a slideshow. Among those who will find the window picture system both practical and enjoyable are schools, hotels, hospitals, assisted living facilities, nursing homes and the like.

The window picture system is an electrically powered, battery powered, or solar powered device which allows for a direct connection to a scanner in order to upload one or more photographs or other suitable one or more images onto the inserted SD card, as well as to connect to computers for the purpose of selecting appropriate music to play with the one or one or more images. The window picture system may be readily available in a double-paned window or a single-paned window with the interior lined with three-dimensional film, similar to that of three-dimensional glasses. The consumer can then project their one or more photos directly onto the film by replacing their existing window or hanging it on their wall as a decorative piece.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:

1. A window picture system, comprising:
   a retractable window shade pulled down from a top portion of a window, the window utilized in combination with the window picture system;
   one or more images that include a selected one of one or more pictures, one or more photographs and one or more drawings;
   a window frame with a bottom;
   a window sill with a top surface, the window sill is perpendicularly attached to the bottom of the window frame, the window sill extends outward from the bottom of the window frame;
   a three dimensional projector that displays the selected one of the one or more images and one or more slide shows onto the retractable window shade
   an image change button disposed on the top surface of the window sill the image change button is depressed to move the selected one of the one or more images and the one or more slide shows
   a camera SD card inserted into the three dimensional projector, the three dimensional projector displays the selected one of the one or more images and the one or more slide shows that reside on the camera SD card on the retractable window shade;
   a battery to provide electrical power to the window picture system; and
   a scanner utilized to scan the selected one of the one or more images and the one or more slide shows, the scanner uploads the selected one of the one or more images and the one or more slide shows onto the camera SD card.

2. The window picture system according to claim 1, wherein the window is a double paned window.

3. The window picture system according to claim 1, wherein the retractable window shade is a white window shade.

4. The window picture system according to claim 1, wherein the retractable window shade is a sheet of vinyl.

5. The window picture system according to claim 1, wherein the one or more images is one or more two-dimensional images.

6. The window picture system according to claim 1, wherein the one or more images is one or more three-dimensional images.

7. The window picture system according to claim 1, wherein the window frame is a double paned window frame.

8. The window picture system according to claim 1, wherein the window frame includes an interior lined three dimensional film, the three dimensional film is removably disposed on the window frame.

9. The window picture system according to claim 1, wherein the window picture system utilizes a remote control device to move the selected one of the one or more images and the one or more slide shows.

10. The window picture system according to claim 1, wherein the battery is a selected one of a lithium battery, an alkaline battery and a solar powered battery.

11. The window picture system according to claim 1, wherein the electrical power is powered by an electrical outlet.

12. The window picture system according to claim 1, wherein the scanner is a digital scanner.

13. A window picture system, comprising:
   a retractable window shade pulled down from a top portion of a double paned window, the double paned window utilized in combination with the window picture system;
   one or more images that include a selected one of one or more pictures, one or more photographs and one or more drawings;
   a double paned window frame with a bottom, the double paned window frame includes an interior lined three dimensional film, the three dimensional film is removably disposed on the double paned window frame;
   a window sill with a top surface, the window sill is perpendicularly attached to the bottom of the window frame, the window sill extends outward from the bottom of the window frame;
   a three dimensional projector that displays the selected one of the one or more images and one or more slide shows onto the retractable window shade;
   an image change button disposed on the top surface of the window sill, the image change button is depressed to move the selected one of the one or more images and the one or more slide shows;
   a camera SD card inserted into the three dimensional projector, the three dimensional projector displays the selected one of the one or more images and the one or more slide shows that reside on the camera SD card;
   a battery to provide electrical power to the window picture system, the battery is a selected one of a lithium battery, an alkaline battery and a solar powered battery; and
   a digital scanner utilized to scan the selected one of the one or more images and the one or more slide shows, the scanner uploads the selected one of the one or more images and the one or more slide shows onto the camera SD card.

14. The window picture system according to claim 13, wherein the retractable window shade is a white window shade.

15. The window picture system according to claim 13, wherein the retractable window shade is a sheet of vinyl.

16. The window picture system according to claim 13, wherein the one or more images is one or more two-dimensional images.

17. The window picture system according to claim 13, wherein the one or more images is one or more three-dimensional images.

18. The window picture system according to claim 13, wherein the window picture system utilizes a remote control device to move the selected one of the one or more images and the one or more slide shows.

19. The window picture system according to claim 13, wherein the electrical power is powered by an electrical outlet.

20. The window picture system according to claim 13, wherein the window picture system is in communication with a computer, the computer to download selected music to play with the selected one of the one or more images and the one or more slide shows onto the camera SD card.

* * * * *